INVENTORS
DONALD F. BRACE
and ARTHUR L. WILLIAMS

Nov. 20, 1956  A. L. WILLIAMS ET AL  2,771,046
APPARATUS FOR PRODUCING TUBULAR MEMBERS
Filed June 29, 1951  7 Sheets-Sheet 6

INVENTORS
DONALD F. BRACE
and ARTHUR L. WILLIAMS
By
Attorney

United States Patent Office 2,771,046
Patented Nov. 20, 1956

2,771,046

APPARATUS FOR PRODUCING TUBULAR MEMBERS

Arthur L. Williams, Warren, Ohio, and Donald F. Brace, Berkley, Mich., assignors to The Federal Machine and Welder Company, Warren, Ohio, a corporation of Ohio Application June 29, 1951, Serial No. 234,238

1 Claim. (Cl. 113—11)

This invention relates to apparatus for producing tubular members, more particularly to such apparatus for producing tubular members with great accuracy, speed and economy, and the principal object of this invention is to provide new and improved apparatus of this character.

The apparatus herein disclosed is primarily designed to form cylindrical members which, after subsequent operations, form containers for various commercial uses. The drawings, and the accompanying specification, are therefore directed to apparatus for forming cylindrical members although it will be obvious that the apparatus is not limited to such use. Any tubular section could easily be produced on the apparatus herein disclosed by a simple substitution of certain parts.

In the drawings accompanying this specification and forming a part of this application, there is shown, for purposes of illustration, an embodiment which this invention may assume, and in these drawings.

Figure 1:
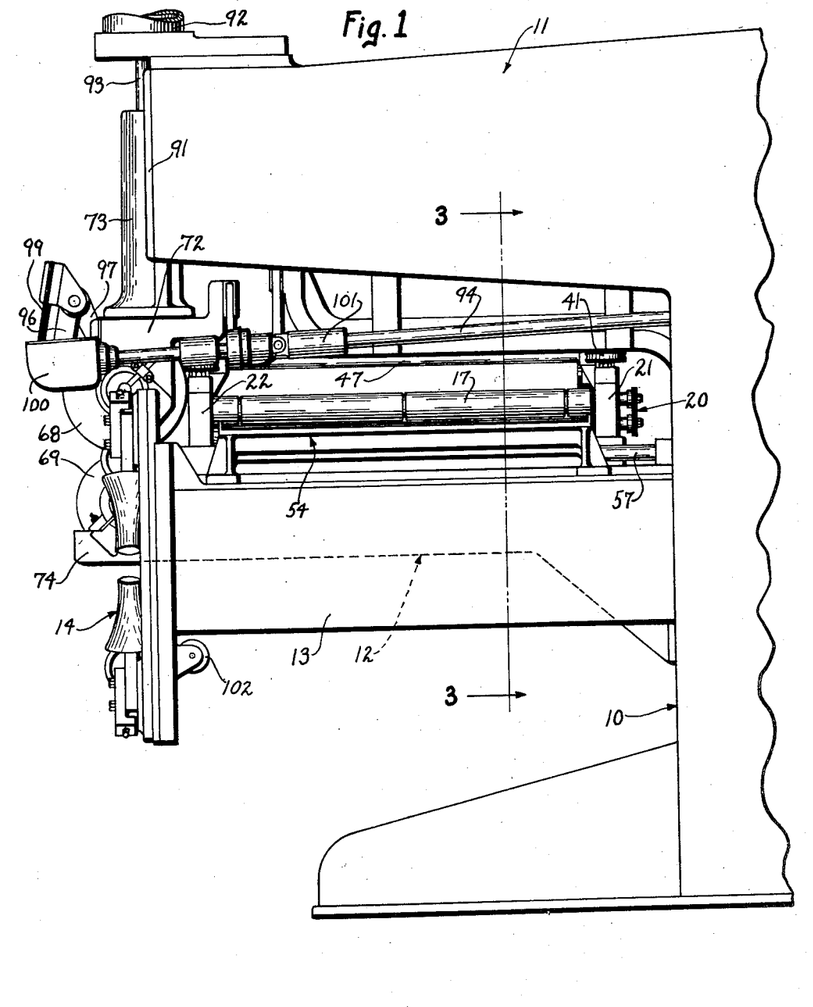
Figure 1 is a fragmentary side elevational view of my improved apparatus for producing tubular members.
Figure 2:
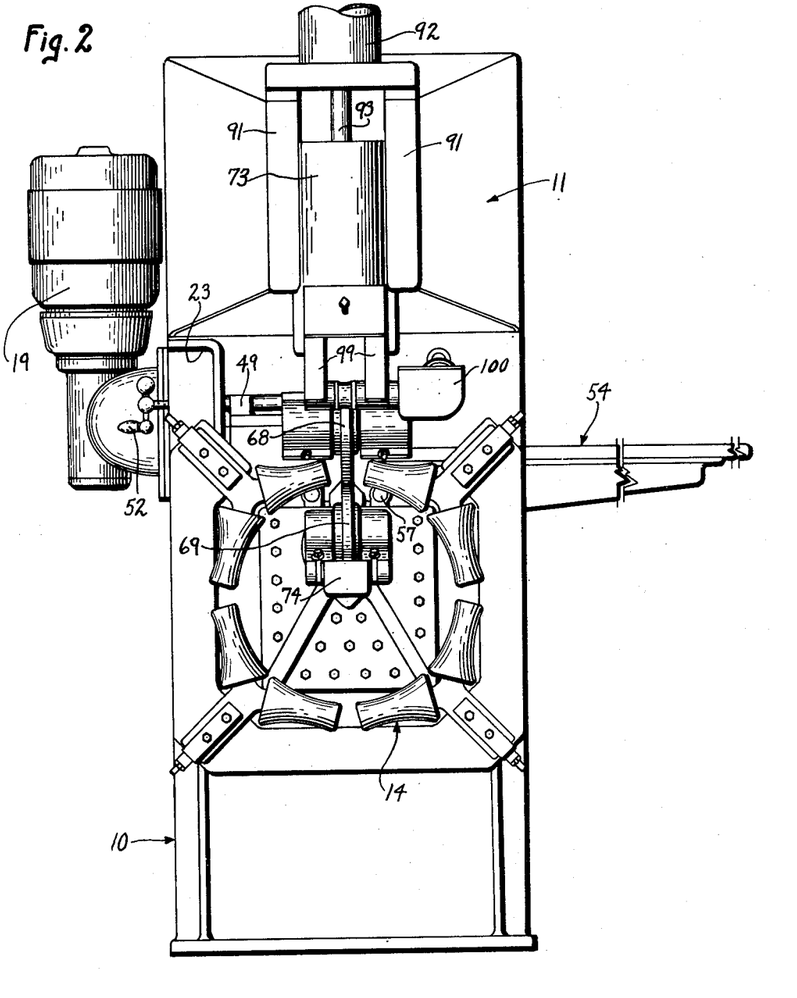
Figure 2 is a front elevational view of the apparatus.

As best seen in Figures 1 and 2, the apparatus herein disclosed to illustrate an embodiment of the invention comprises a pedestal 10, a horizontally projecting upper arm 11, and a similarly projecting lower arm 12. A pair of side members 13 extend outwardly of the pedestal 10 on each side of the lower arm 12 for the purpose of providing a mounting for a set of sizing rolls 14.

Secured within the throat of the apparatus between the two arms 11 and 12, is the forming mechanism 15. As presently disclosed, this forming mechanism comprises three forming rolls, 16, 17 and 18, all of which are driven by a motor-reducer unit 19 through a series of sprockets and chains that are collectively indicated at 20.

End plates 21, 22, which carry the forming rolls therebetween, are secured to a bracket 23 in any suitable manner. The bracket 23 is secured to the pedestal 10 by bolts 24 and this bracket also provides a hanger 25 for mounting the motor-reducer unit 19.

In the embodiment herein disclosed, the roll 16 may be termed the stationary drive roll, since this roll is mounted on the end plates 21, 22 for rotative movement only. The roll 16 provides three kick-out pins 24 (see Figure 3) for a purpose later to be disclosed.

The floating drive roll 17 is rotatable in bearings at each end thereof, and these bearings are carried by respective chocks 25. The chocks 25 are each mounted for vertical sliding movement in openings 26 in the end plates 21, 22, and the chocks are constantly urged downwardly to press roll 17 into engagement with roll 16 by means of springs (not shown) whose tension may be adjusted by screws 27. It will be apparent that the roll 17 may be yieldably pressed into engagement with the roll 16, with any desired degree of force, by adjustment of the screws 27. The roll 17 is provided with circumferential grooves 28 that are in registry with the kick-out pins 24 in the roll 16, the grooves preventing interference between the roll 17 and the pins 24.

The deflection roll 18 is mounted for vertical movement in openings 29 in the end plates 21, 22, in a manner similar to the arrangement of roll 17. This roll, however, may be adjusted and held in adjusted position to form the stock to the desired radius.

Figures 7, 8, 9:
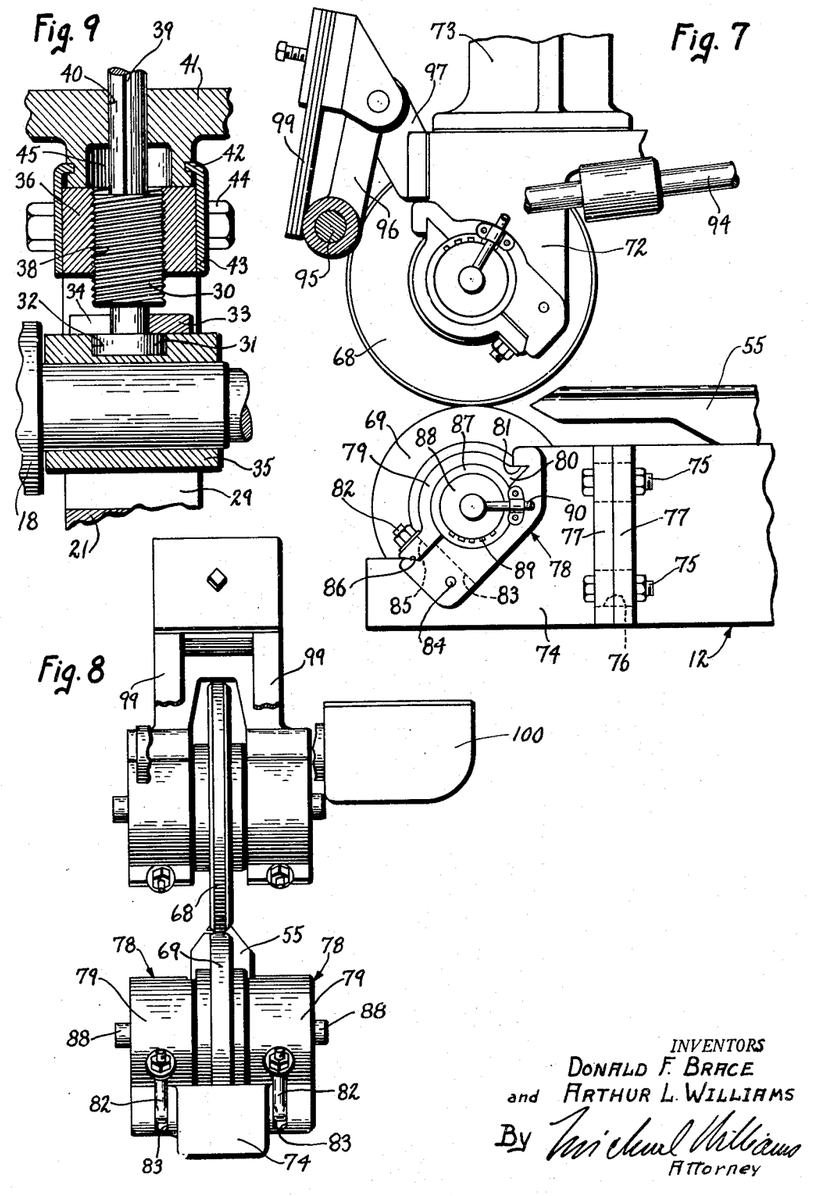
Figure 7 is an enlarged, fragmentary side elevational view of certain operating parts.
Figure 8 is a front elevational view of the mechanism illustrated in Figure 8, certain parts being broken away for clarity.
Figure 9 is a fragmentary sectional view generally corresponding to the line 9—9 of Figure 3.

As best shown in Figure 9, a chock 35 rotatably carries the roll 18, and a threaded screw 30, having reduced end portions, is arranged to provide for vertical adjustment of the chock. Only one end of the roll 18 is shown and described (with reference to Figure 9), but it will be understood that both ends of the roll are similarly arranged and provided with similar parts.

Each screw 30 has its lower reduced-end portion formed to provide a head 31 that is receivable within a recess 32 provided in the upper portion of a respective chock 35. A plate 33, having a slot 34 of a size to pass the reduced-end portion, is secured to the top of each chock to prevent withdrawal of a respective head 31 from the recess 32. A bridge 36 (see Figure 3 also) is secured to the top of the end plate 21 and a bridge 37 is similarly secured to the top of the end plate 22. A threaded aperture 38 is provided in each of the bridge members to engage with the threaded portion of a respective screw 30.

The upper reduced-end portion of each screw 30 is provided with a keyway 39 which has sliding engagement with a key secured in a bore 40 provided in a worm wheel 41. The hub of the worm wheel 41 has a circumferential groove 42 provided in its periphery and clips 43 are engageable with the circumferential groove. The clips 43 are secured to respective bridge members 36, 37 by means of screws 44, the construction being such that the clips permit the worm wheel to rotate freely, yet prevent axial displacement thereof. The bore 40 of the worm wheel is of a size to readily slide upon the upper reduced-end portion of its screw 30, and the lower portion of the bore is enlarged at 45 for a purpose to be shown.

From the foregoing, it will be seen that rotation of the worm wheels 41 will cause rotation of respective screws 30, and because of the threaded engagement of the screws with respective bridges 36, 37, each screw and the attached chock 35 will move upwardly or downwardly depending upon the direction of rotation of the worm wheel. The screw 30 is permitted this vertical movement, since, as before mentioned, the bore 40 of the worm wheel 41 is slidable on the upper reduced-end portion of the screw. The bore enlargement 45 is provided in the worm wheel 41 in order to allow clearance over the threaded portion of the screw 30 at certain adjustments.

Figure 4:
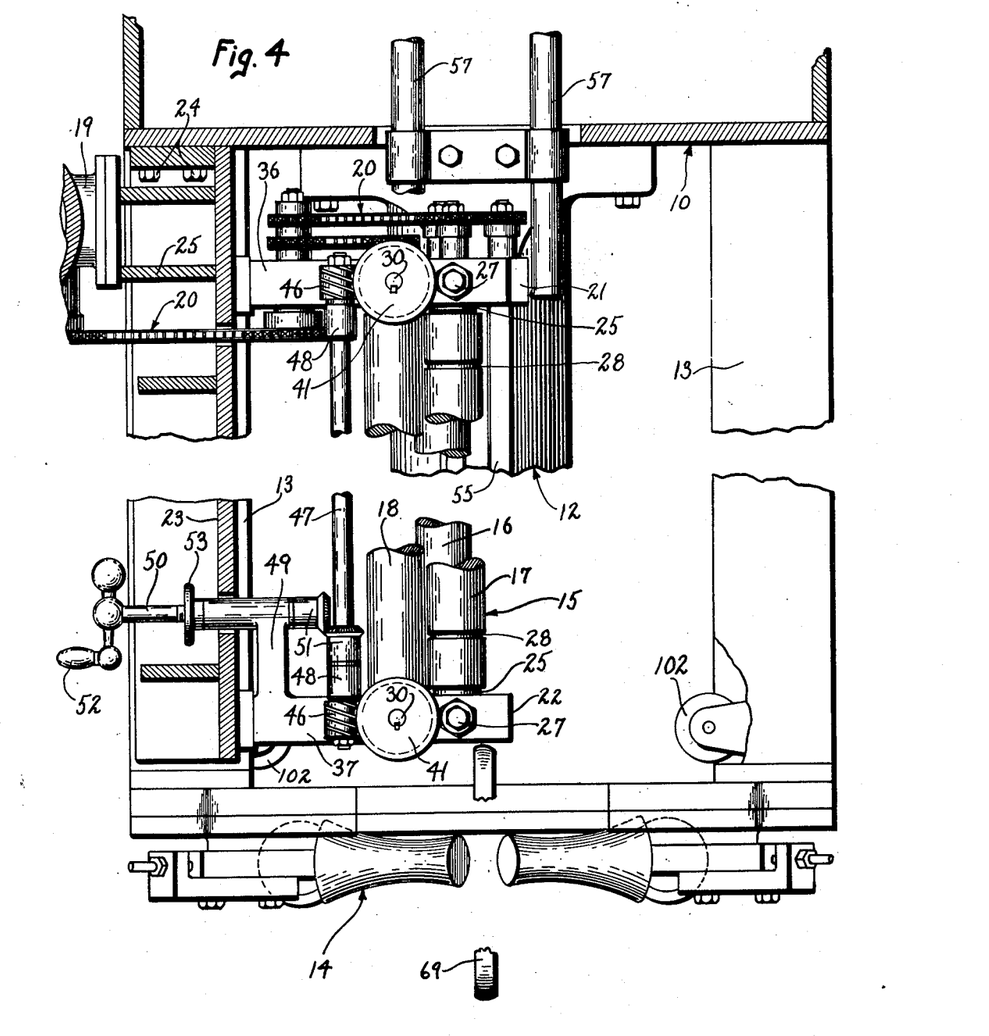
Figure 4 is a fragmentary sectional view generally corresponding to the line 4—4 of Figure 3.

The mechanism presently provided for rotation of the worm wheels 41 and adjustment of the position of the roll 18 thereby, may best be seen in Figure 4. A pair of worms 46 are therein shown to be meshed with respective worm wheels 41, the worms being secured together for unitary rotation by a shaft 47. The shaft 47 is journalled in hangers 48 which are supported by respective bridge members 36, 37, and the bridge member 37 additionally provides a hanger 49 which rotatably carries an intersecting shaft 50. The shafts 47 and 50 are provided with meshed miter gears 51 which are secured thereto for rotation therewith. The shaft 50 is provided with a crank 52 for causing rotation thereof, and a locking wheel 53 is threaded upon the shaft 50 to prevent undesirable rotation thereof and thus prevent unintentional shifting movement of the roll 18.

It will now be evident that simultaneous adjustment of both ends of the roll 18 may be accomplished by first loosening the lock wheel 53, and then rotating the shaft 50 by means of the crank 52. Through the mechanism previously described, a simultaneous rotation of the screws 30 will be effected, and this will cause the roll 18 to move up or down depending upon the direction of rotation of the crank 52.

Figure 3:
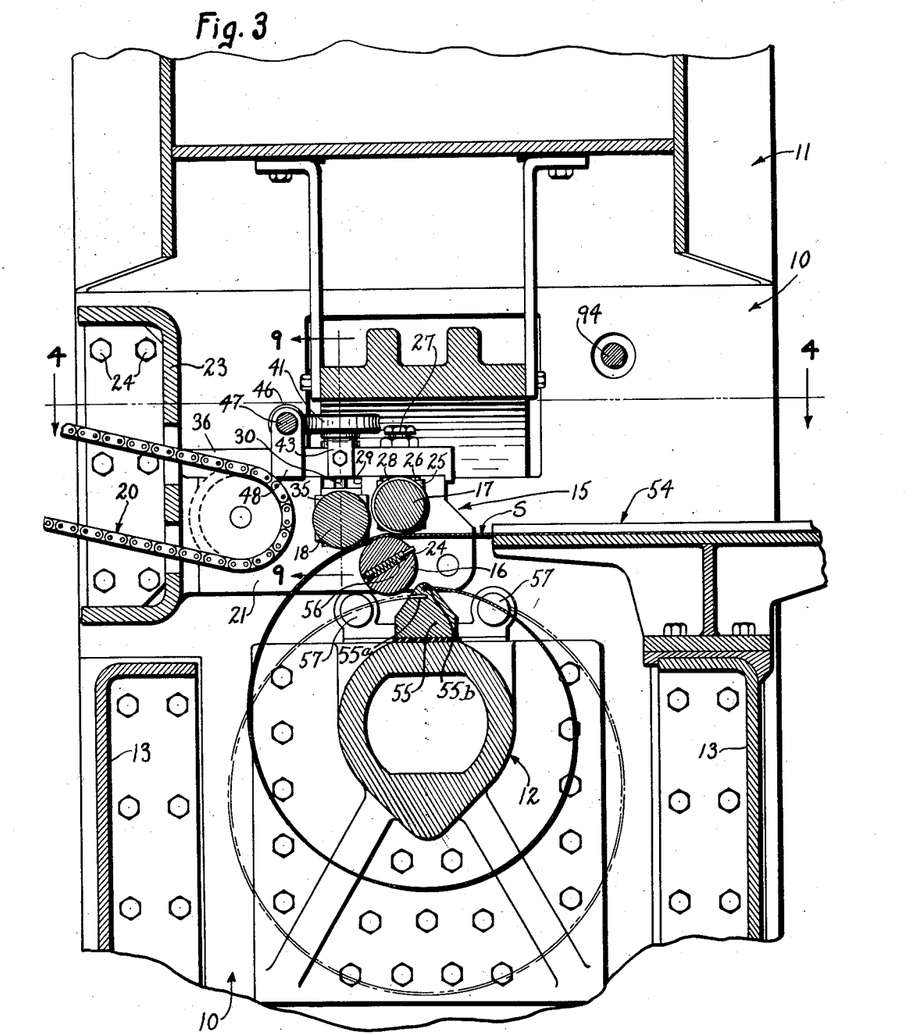
Figure 3 is an enlarged, fragmentary sectional view generally corresponding to the line 3—3 of Figure 1.

As may be seen in the various views, a feed table 54 is provided to support and aline the stock as it is fed into the machine. With reference to Figure 3, the stock S, previously cut to the proper size for the cylindrical member desired, is fed between the rotating roll 16, 17. The stock is drawn between the rolls and as it emerges, it strikes the rotating deflection roll 18 which bends the stock back upon itself and forms it into a cylindrical shape.

As shown in Figures 2, 3 and 7, an elongated bar 55 is secured to the upper surface of the lower arm 12. This bar is provided with slots 55a and 55b on opposite sides thereof, the slots being vertically offset and arranged so that the bottoms of the slots overlap each other.

As the leading edge of the stock S leaves the forming rolls, it moves around the lower arm 12 and enters the right-hand slot 55b (as viewed in Figure 3) in the bar 55. Guides (not shown) may be provided, if necessary, to assure entrance of the stock in the slot.

Because of the curvature of the stock after the forming operation, the trailing edge of the stock tends to remain in the vicinity of the upper portion of the roll 16. This tendency of the trailing edge of the stock to remain along the upper portion of the roll 16 is overcome by the previously mentioned kick-out pins 24 provided in the roll. The pins 24 are normally urged to project beyond the periphery of the roll by means of springs 56, and are forced inwardly against the compression of the springs 56 as the stock passes between the roll, but after passage of the stock, the pins again snap out.

Assuming the trailing edge of the stock to be curled along the roll 16, it will be evident that as the roll rotates, the projecting pins engage the trailing edge and shove it to a position beneath the roll 16 where it will snap into the left-hand slot of the bar 55. This position of the stock, with both edges held in the slots of the bar 55 by reason of the tension in the coiled stock, is shown by dot-dash lines in Figure 3.

With the stock in the dot-dash position shown in Figure 3, a pair of ejector rods 57 are operable to slide the stock forwardly and along the slots of the bar 55 and into engagement with the previously mentioned sizing rolls 14.

Figure 5:
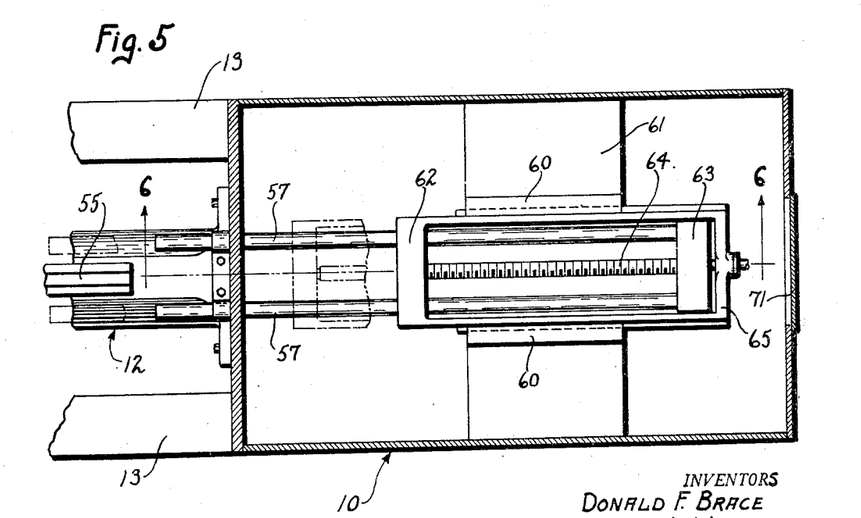
Figure 5 is a fragmentary plan view illustrating certain operating parts in the rear portion of the machine.
Figure 6:
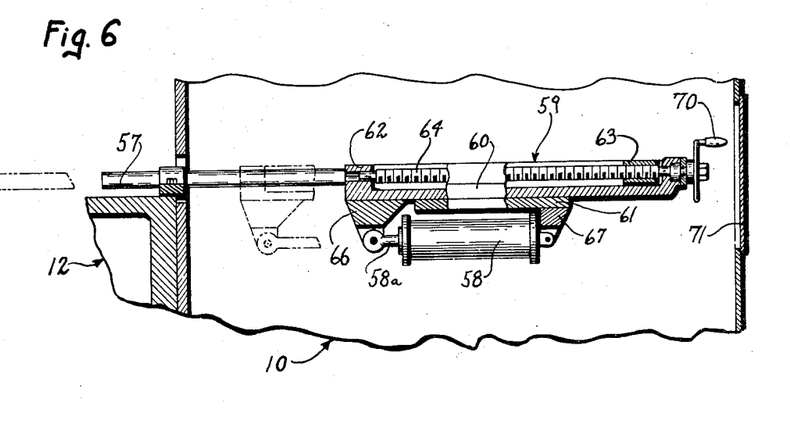
Figure 6 is a fragmentary sectional view generally corresponding to the line 6—6 of Figure 5.

As best seen in Figures 5 and 6, the ejector rods 57 are moved outwardly by means of a fluid cylinder 58 acting upon a carriage 59. The carriage 59 is slidable between gibs 60 which are secured to a transverse plate 61 that spans the side walls of the pedestal 10. The ejector rods 57 pass through enlarged apertures in a forward wall 62 of the carriage 59 and are joined, at their rear extremities, by a cross-member 63. A screw 64, journalled in the forward wall 62 and in a rear wall 65, is located between the rods 57, the screw being threadably engaged with the crossmember 63 for securing the crossmember, and its attached rods 57, to the carriage 59 for movement therewith.

Referring to Figure 6, it will be seen that a bracket 66 is secured to the underside of the carriage 59. This bracket is engageable with a piston rod 58a of the fluid cylinder 58, while the rear of the cylinder is secured to the plate 61 by means of a depending bracket 67. From the foregoing description it will be seen that as the piston rod 58a is moved to its dot-dash position, carriage 59, screw 64, and cross-member 63 with its attached rods 57, will all be moved forward, or to the left as shown in the drawing.

Since the stroke of the cylinder 58 is just sufficient to move the stock into engagement with the sizing rolls and between welding electrodes 68, 69, it is necessary to move the starting or retracted position of the rods 57 further to the left in order for the rods to properly engage with shorter cylindrical members which necessarily are formed of narrower stock. This adjustment of the rods 57 is accomplished by rotating a crank 70 which is secured to the screw 64. Rotation of the screw will cause crossmember 63 and its attached rods 57 to move independently of the carriage 59. A door 71 may be provided in the rear wall of the pedestal 10 to provide access to the crank 70.

In the presently disclosed embodiment, the two adjacent edges of the formed stock are welded together by the electric resistance process, through use of a pair of seam-welding wheels. These wheels may be seen in various views but are shown in detail in Figures 7 and 8. Both wheels are mounted for rotation in their respective supports, the lower wheel 69 being mounted on an extension 74 of the lower arm 12, and the upper wheel 68 being mounted on a member 72 attached to a slide 73. The upper wheel is resiliently urged downwardly into contact with the lower wheel for a purpose and by means later to be disclosed.

The lower wheel, as previously mentioned, is rotatably secured to an extension 74 which is bolted to the outboard end of the lower arm 12 by bolts 75. The abutting ends of the members 12 and 74 are each provided with flanges 77 and these flanges provide slots 76 to pass the bolts 75. The slots are provided so that member 74, and its attached wheel 69, may be properly positioned vertically with respect to the overlapped edges of the stock held in the bar 55.

Seam-welding wheels are subject to relatively rapid wear, and therefore, provision has been made for quick and easy replacement of a worn wheel. Since the method of mounting the upper and lower wheels are similar, only the lower wheel and its associated parts will be described, it being understood that the description is equally applicable to the upper wheel.

The lower wheel 69 is rotatably secured in spaced bearings 78, part of the bearing being formed in the extension 74, and part being provided by a bearing cap 79. As clearly shown in Figure 7, each of the caps 79 has one end formed to provide a tongue portion 80 which is engageable in a respective groove 81 formed in the extension 74. The opposite end of each of the caps 79 is secured to the extension 74 by means of a bolt 82. Each of the bolts 82 is pivotally secured at 84 within a slot 83, the slots being formed in the extension 74.

A slot 85 is provided in an end of each of the caps 79 to allow a respective bolt 82 to be swung about its pivot to the engagement position shown. Matching beveled portions 86 are provided by the ends of the caps 79 and the extension 74, for the purpose of properly seating the caps against the extension.

A ring 87 is presently interposed between the bearings 78 and the shaft 88 of the wheel 69 in order to provide an easily replaceable bearing surface. Inserts 89 may be provided on the inner, load-carrying surface of the ring 87 for increasing electrical conductivity between the rotating wheel and its stationary support.

Conduits 90 may be plugged into axial openings in the shaft 88 to provide for a flow of coolant fluid to internal passages (not shown) within the welding wheels.

Returning once more to the upper wheel 68, it will be understood after examination of Figures 1 and 2, that the slide 73 is held to vertical movement by means of gibs 91 that are secured to the front of the upper arm 11. A fluid cylinder 92 is affixed to the upper arm and this cylinder provides a piston rod 93 which is secured to the slide 73. Fluid pressure in the cylinder 92 normally urges the slide 73, and the attached wheel 68, downwardly until the wheel 68 engages the wheel 69.

At the present time, only the upper wheel 68 is power driven, the lower wheel being allowed to rotate freely in response to the tangential forces which act upon its periphery. The upper wheel is driven by a variable-speed drive mechanism (not shown) that is contained within the pedestal 10, the drive including an output shaft 94 which projects toward the front of the machine.

A cross-shaft 95 is journalled in one end of a link 96, and the other end of the link 96 is pivotally engaged with a bracket 97 that is secured to the member 72. The cross-shaft 95 has a drive knurl affixed thereon (see Figures 1 and 3) and the knurl is spring pressed against the periphery of the upper welding wheel by means of laminated leaf springs 99. The shaft 95 is driven by the shaft 94 through a pair of gears contained within the gear box 100, and a suitable universal joint 101 may be interposed in the shaft 94.

As best shown in Figures 1, 2 and 4, the set of rolls 14 is provided to accurately size the tubular member. The rolls are contoured to closely approximate the desired tubular shape, and as hereinbefore mentioned, the instantly formed shape is cylindrical. The rolls, therefore, are arranged to provide a circular opening of the correct size through which the cylindrical member is moved. The rolls 14 are arranged in pairs and each pair is adjustable toward and away from the axis of the path of movement of the cylindrical member to provide for size adjustment.

Rolls 102 may be provided for engaging the cylindrical member just prior to its engagement with the rolls 14. These rolls 102 have a contour similar to that of the rolls 14 and act as guide rolls to steady the cylindrical member and to partially size it before it enters the rolls 14.

Assuming that a cylinder of a given diameter and length is to be formed, and that a number of sheets, cut to the proper length and width, are on the feed table 54, the various adjustments of the machine may then be made. The roll 17 may be adjusted with respect to the roll 16 to properly grip the stock therebetween, and the deflector roll 18 may then be adjusted, by means of the crank 52, to form the stock to the desired cylindrical size. The adjustment of the roll 18 is preferably such that the stock is slightly over-formed in order for the leading and trailing edges to be firmly sprung into their respective slots in the bar 55 (see Figure 3). After setting up the rolls 14 and 102, and adjusting position of the ejector rods 57 (by operation of the crank 70) for the length of the cylinder to be formed, the operation of the machine is as follows:

The operator will first close switches which will energize the motor-reducer unit 19 that drives the forming rolls, and also energize the drive unit (not shown) that is operable to drive the upper weld wheel 68. The operator will first lower the upper weld wheel and then feed the stock S between the rolls 16, 17. From this point, ensuing operations of the machine are performed automatically as will later be shown.

As best seen in Figure 3, and as previously described, the stock will be formed into cylindrical shape with the leading and trailing edges thereof secured in juxtaposed relation in the slots of the bar 55. A trip device will operate after the stock is seated in the slots, and this will permit fluid under pressure to enter the cylinder 58 and move the ejector rods 57 into contact with the rear of the stock. Under the pressure of the ejector rods, the stock will slide along the bar 55 and into contact first with rolls 102, and then with the rolls 14.

At or about the time the stock engages the rolls 14, but preferably shortly thereafter, the stock will be moved between the rotating weld wheels by the ejector rods. The weld wheels will immediately begin to drive the stock, while the ejector rods will be caused to return to their original, retracted position by a reversal of fluid pressure in the cylinder 58.

It will be recalled that the upper weld wheel is being held in contact with the lower weld wheel by the action of the fluid cylinder 92 pressing upon the slide 73. Therefore, as the stock enters between the wheels, the upper wheel is forced upwardly against the pressure of the cylinder 92 a distance equal to the combined thickness of the overlapped stock. This movement of the upper weld wheel actuates a switch which allows welding current to flow from the usual welding transformer (not shown) to the weld wheels, and the welding operation will take place in the manner customary in seam welding operations.

The automatic control circuit of the hereinbefore described apparatus is shown schematically in Figure 10, and its operation is as follows:

After starting the motor-reducer unit 19 and the motor unit (not shown) which drives the upper welding wheel, and before feeding the stock S into the forming rolls, the operator will press a push button 103. This push button 103 will cause the upper welding wheel to move downwardly into contact with the lever welding wheel, and the button will additionally alert the control circuit for subsequent operations.

Figure 10:
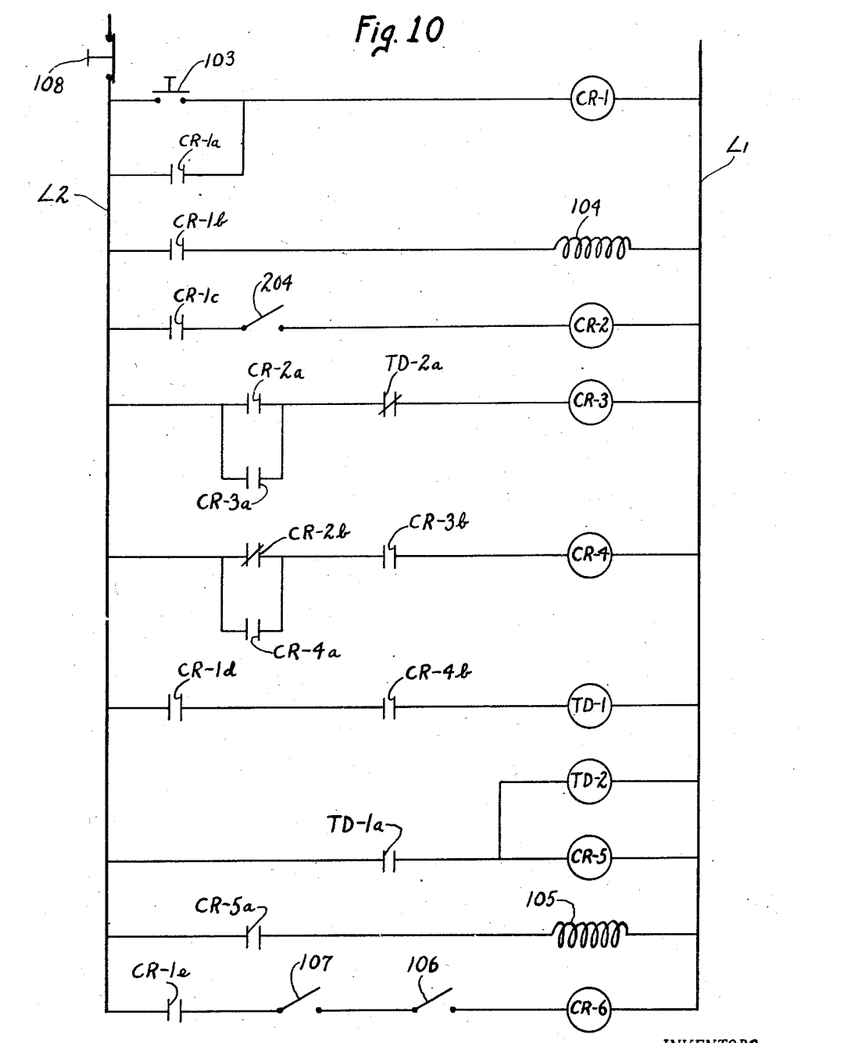
Figure 10 is a schematic diagram of the electric control circuit of the apparatus.

As shown in Figure 10, pressing of button 103, will allow current to flow from L1 to L2 through a relay CR–1. As the relay CR–1 is energized, it will close contacts CR–1a that act to maintain current through the relay after the push button 103 is released. Energization of relay CR–1 will also close contacts CR–1b and allow current to flow through a solenoid 104 of an air control valve that controls operation of the air cylinder 92. Energization of the solenoid 104 will shift the valve to admit air pressure to the cylinder 92 in manner so that the upper welding wheel 68 is pressed against the lower welding wheel 69. The normally open contacts CR–1c, CR–1d, and CR–1e are also closed by the energization of relay CR–1, and the control circuit is now ready to function automatically.

As a sheet of stock S is fed from the feeding table 54 to the forming roll unit 15, the stock will close a limit switch 204. Current may now flow through a relay CR–2 since contacts CR–1c are closed, and the energization of relay CR–2 will close contacts CR–2a and open contacts CR–2b. The closing of contacts CR–2a will complete a circuit to relay CR–3 through normally closed contacts TD–2a and as relay CR–3 closes, contacts CR–3a will complete a holding circuit to relay CR–3. Energization of relay CR–3 will also close contacts CR–3b which are in the circuit to a relay CR–4, but since the normally closed contacts CR–2b remain open as long as the relay CR–2 is energized, no current will flow through relay CR–4 at this time.

It will be recalled that the limit switch 204 is closed by the stock as it is fed to the forming rolls, and this switch remains closed until the entire sheet of stock has been drawn into the rolls. When the stock has cleared the limit switch 204, the switch will open and de-energize relay CR–2. Relay CR–2 will now cause contacts CR–2a to re-open and contacts CR–2b to close once more. The relay CR–3 will remain closed, however, because of the holding circuit through contacts CR–3a, and the now closed contacts CR–2b will permit current to flow through the relay CR–4.

Upon energization, relay CR–4 will close contacts CR–4a to complete a holding circuit and will also close contacts CR–4b to energize a time-delay relay TD–1.

The relay TD-1 is set to time out after the formed stock has had sufficient time to become securely seated in the slots of the bar 55. When the relay TD-1 times out, it will close contacts TD-1a and energize a relay CR-5 and also energize a time-delay relay TD-2.

Energization of relay CR-5 will close contacts CR-5a and allow current to flow through a solenoid 105 which controls operation of an air control valve connected to the ejector cylinder 58. As the solenoid 105 is energized, it shifts the valve to admit air pressure to the cylinder 58 in manner to move the ejector rods 57 outwardly. The ejector rods 57 will slide the now formed stock along the slots in the bar 55, through the sizing rolls, and between the upper and lower welding wheels.

As the stock enters between the contiguous welding wheels, the upper wheel is forced upwardly against the pressure of the air cylinder 92 a distance equal to the thickness of the overlapped stock. This upward movement of the wheel causes a limit switch 106 to close in the circuit to a relay CR-6. This relay, however, will become energized only if there is sufficient pressure between the welding wheels to complete a satisfactory weld. This determination of pressure is controlled by a pressure responsive switch 107 that is connected to the air cylinder 92.

Assuming that there is sufficient pressure to complete a satisfactory weld, the pressure responsive switch 107 will be closed, and therefore, when the limit switch 106 closes, the relay CR-6 will be energized. This relay CR-6 will effect operation of the usual circuit to cause current from a welding transformer to flow between the welding wheels.

After the formed stock enters between the welding wheels, the relay TD-2 will time out. This will open the normally closed contacts TD-2a in the circuit of the relay CR-3 and will cause all of the circuits to open except that of relay CR-1 and solenoid 104, and the circuit of relay CR-6 which controls the welding current. With the deenergization of the solenoid 105, the valve which controls the ejector cylinder 58 will shift and cause the ejector rods 57 to retract to their starting position.

Welding current will continue to flow until the length of stock has been driven out from between the welding wheels as a completed tubular member. At this time the welding wheels will move together again, opening the switch 106 and de-energizing relay CR-6 and thus terminating the flow of welding current.

As soon as the ejector rods 57 have been retracted, another sheet of stock may be fed to the machine and a repetition of the afore described operations will cause the completed tubular members to flow from the machine in rapid succession.

As a safety device, a push button 108 is provided and may be operated at any desired time to open all of the foregoing control circuits and to raise the upper welding wheel.

It will now be clear that the machine hereinbefore described will automatically form, size, and seamweld stock that is fed thereto, in manner to provide a completed cylindrical member.

In view of the foregoing it will be apparent to those skilled in the art that we have accomplished at least the principal object of our invention and it will also be apparent to those skilled in the art that the embodiment herein described may be variously changed and modified, without departing from the spirit of the invention, and that the invention is capable of uses and has advantages not herein specifically described, hence it will be appreciated that the here disclosed embodiment is illustrative only, and that my invention is not limited thereto.

We claim:

In apparatus for forming sheet stock, the combination comprising a pair of rolls forming a pass for said stock and rotatable to drive said stock through said pass, deflector means engageable with said stock to bend the latter as it leaves said pass, a pin transversely carried by one of said rolls and yieldably urged to project beyond the periphery thereof, said pin being held inwardly of the periphery of said one roll by engagement with the stock moving through said pass and said pin projecting outwardly of the periphery of said one roll when clear of said stock to engage the trailing edge of said stock and move such trailing edge away from said rolls, and means to prevent interference between said pin and the other roll of said pair of rolls and comprising a circumferential groove formed in the periphery of said other roll in axial alignment with said pin.

References Cited in the file of this patent

UNITED STATES PATENTS

| | | |
|---|---|---|
| 739,366 | Wann | Sept. 22, 1903 |
| 742,905 | Richter | Nov. 3, 1903 |
| 746,124 | Mosher | Dec. 8, 1903 |
| 1,094,179 | Warme | Apr. 21, 1914 |
| 1,434,229 | Schaeffer | Oct. 31, 1922 |
| 1,475,399 | Kornquest | Nov. 27, 1923 |
| 1,990,579 | Adams | Feb. 12, 1935 |
| 2,047,964 | Hothersall | July 21, 1936 |
| 2,187,740 | Hothersall | Jan. 23, 1940 |
| 2,196,106 | Darner | Apr. 2, 1940 |
| 2,288,287 | Kokay | June 30, 1942 |
| 2,290,184 | Higgins | July 21, 1942 |
| 2,307,089 | Winters | Jan. 5, 1943 |
| 2,371,209 | Anderson | Mar. 13, 1945 |
| 2,405,373 | Seeley | Aug. 6, 1946 |
| 2,513,643 | Griner | July 4, 1950 |

FOREIGN PATENTS

| | | |
|---|---|---|
| 45,325 | Germany | Nov. 17, 1888 |
| 266,650 | Italy | Aug. 6, 1929 |
| 587,953 | Germany | Nov. 10, 1933 |